United States Patent

Aymerich et al.

[11] Patent Number: 5,340,186
[45] Date of Patent: Aug. 23, 1994

[54] ATTACHMENT DEVICE FOR SUNVISOR VANITY MIRRORS

[75] Inventors: José Aymerich; Jesûs Prat, both of Rubi, Spain

[73] Assignee: Fico I.T.M. S.A., Rubi, Spain

[21] Appl. No.: 969,822

[22] PCT Filed: May 21, 1992

[86] PCT No.: PCT/ES92/00041
§ 371 Date: Jan. 15, 1993
§ 102(e) Date: Jan. 15, 1993

[87] PCT Pub. No.: WO92/21527
PCT Pub. Date: Dec. 10, 1992

[30] Foreign Application Priority Data

Jun. 4, 1991 [ES] Spain .................. 9101336

[51] Int. Cl.$^5$ .................. B60J 3/02
[52] U.S. Cl. .................. 296/97.1; 296/97.2; 248/221.3
[58] Field of Search .......... 296/97.1, 97.5, 97.2; 248/221.3

[56] References Cited

U.S. PATENT DOCUMENTS

| 3,843,236 | 10/1974 | Kurz, Jr. | |
| 4,213,169 | 7/1980 | Kempkers | |
| 4,275,916 | 6/1981 | Skogler | 296/97.5 |
| 4,391,053 | 7/1983 | Anthony | 296/97.5 X |
| 4,494,789 | 1/1985 | Flowerday | |
| 4,866,579 | 9/1989 | Miller et al. | |
| 5,205,639 | 4/1993 | White et al. | 296/97.2 X |

FOREIGN PATENT DOCUMENTS

| 0275903 | 7/1988 | European Pat. Off. | |
| 0402586 | 12/1990 | European Pat. Off. | |
| 0403846 | 12/1990 | European Pat. Off. | 296/97.1 |
| 3433637 | 3/1986 | Fed. Rep. of Germany | 296/97.5 |
| 3438343 | 4/1986 | Fed. Rep. of Germany | |
| 3724983 | 2/1988 | Fed. Rep. of Germany | |
| 4023243 | 11/1991 | Fed. Rep. of Germany | 296/97.2 |
| 2622258 | 4/1989 | France | 403/13 |
| 0226421 | 9/1989 | Japan | 296/97.1 |

Primary Examiner—Russell D. Stormer
Attorney, Agent, or Firm—Michael J. Striker

[57] ABSTRACT

The attachment device has a plurality of attachment projections (1) and respective retaining elements (MR). The attachment projections (1) are essentially cylindrical and project from the bottom wall of the cavity (2) formed in the one-piece casing (3), produced by plastics blow molding techniques, of the sunvisor. The cavity (2) receives the vanity mirror boxlike shell (4) so that the attachment projections (1) penetrate in the interior of the boxlike shell (4) through respective through holes (7). The boxlike shell (4) is firmly fixed in the cavity (2) by retaining means (MR) constituted by a plastic deformation (10) of the free end of the attachment projection (1), or by a self-tapping screw (11) or by an internally toothed washer (12), or by a self-tapping nut (14) which, in any case, presses the boxlike shell (4) against the bottom wall of the cavity (2).

8 Claims, 2 Drawing Sheets

ATTACHMENT DEVICE FOR SUNVISOR VANITY MIRRORS

BACKGROUND OF THE INVENTION

The present invention relates to an attachment device for automobile sunvisor vanity mirrors which, in particular, is applicable to sunvisors having a one-piece plastics material casing.

It is well known that automobile sunvisors are provided as original equipment with a mirror which is usually known as a vanity mirror. The vanity mirror may be simply superimposed on the sunvisor or it may be integrated in the sunvisor structure. The vanity mirrors integrated in the sun visor structure comprise in general essentially a boxlike shell and a cover plate. The boxlike shell of the vanity mirror is basically prismatic in shape and is open on the front surface thereof, the boxlike shell being dimensioned to contain the mirrored surface as such as well as other devices related with the functionality of the vanity mirror. The vanity mirror cover plate is attached to the boxlike shell and may be operated at will by the user so that the latter may conceal the mirrored surface or open it to view.

In the vanity mirrors based on a one-piece plastics material casing produced by blow moulding such materials, the boxlike shell of the vanity mirror is housed in a cavity formed for that purpose in the corresponding side of the sunvisor.

The vanity mirror boxlike shell is usually attached to the cavity of the sunvisor casing by adhesives. In certain cases, adhesive products applied on the corresponding facing surfaces are used. In other cases, attachment is achieved by one or more portions of flexible tape, both surfaces of which are provided with adhesive products, such that the respective surfaces of the flexible tape portions are attached to the vanity mirror boxlike shell and the opposite sides of the portions are attached to the cavity of the sunvisor casing.

In any case, the attachment of the vanity mirror boxlike shell to the sunvisor casing cavity by adhesive products, as described above, generally has certain drawbacks. On the one hand, the vibrations caused when the vehicle is running frequently cause a precarious attachment or even untimely detachment of the vanity mirror and, on the other hand, the high temperatures which the sunvisors usually reach, from sun radiation among other causes, affect the adhesive products and diminish their adhesive properties, all of which leads, similarly to what was described above, to a weak attachment of the vanity mirror boxlike shell in the sunvisor casing cavity and detachment thereof.

It may be gathered from the foregoing that the described means used for attaching the vanity mirror to the sun visor are of reduced operative reliability which, under certain conditions, may cause dangerous situations and/or accidents and, furthermore, a high financial cost making the end product expensive.

SUMMARY OF THE INVENTION

It is an object of the present invention to provide a cheap and highly operatively reliable attachment means for sunvisor vanity mirrors mounted on a one-piece casing produced by blow molding of plastics materials, there is disclosed a new attachment device for sunvisor vanity mirrors.

The attachment device of the invention is characterized in that the cavity formed in the one-piece casing, produced by plastics blow molding techniques, of the sunvisors for housing the vanity mirror is provided with a plurality of essentially cylindrical attachment projections which are uniformly spaced apart and project to a relatively small extent perpendicularly from the bottom wall of the cavity. The attachment projections penetrate in the interior of the vanity mirror boxlike shell through holes provided at positions positionally mating with the attachment projections on the rear surface or bottom wall of the boxlike shell, the boxlike shell being firmly attached in the cavity of the sunvisor one-piece casing by the locking effect of retaining means on each of the attachment projections.

According to one embodiment, the retaining means for the attachment device of the invention is constituted by a plastic deformed portion of the free end of the attachment projection. The deformed portion is caused by ultrasonic techniques, by heat or by mechanical impact so that the boxlike shell is compressed between the deformed free end of the attachment projection and the bottom wall of the one-piece casing cavity.

According to another embodiment, the retaining means for the attachment device of the invention is constituted by a frustoconical shank self-tapping lock screw which applied longitudinally centrally of the free end of the attachment projection resiliently deforms it so that the boxlike shell is compressed between the upper deformed portion of the attachment projection and the bottom wall of the one-piece casing cavity.

According to another embodiment the retaining means for the attachment device of the invention is constituted by an internally toothed lock washer which fits on the attachment projection, so that the boxlike shell is compressed between the lock washer and the bottom wall of the one-piece casing cavity.

According to another embodiment the retaining means for the attachment device of the invention is constituted by a self-tapping lock nut coupled to the attachment projection so that the boxlike shell is compressed between the lock nut and the bottom wall of the one-piece casing cavity.

The features of the attachment device of the invention described above provide a solution to the problems presented by the known embodiments of means for attaching the vanity mirror to the sunvisor using adhesive products.

In this respect, the fact that the attachment projections of the device of the invention are produced during the casing blow molding operation and the fact that the retaining means holding the boxlike shell of the mirror to the casing may be formed or coupled to the attachment projections in the most appropriate stage of the production process, reduces the production costs of the sunvisor and, in particular, reduces the costs associated with the assembly of the boxlike shell in the corresponding cavity of the casing relative to the known attachment means based on the use of adhesive products in which the latter have to be applied using specific processes in different stages of the sunvisor assembly process.

On the other hand, the operative reliability of the attachment device of the invention is, of its very essence, superior to the reliability obtained with the known attachment means based on the use of adhesive products.

A further advantage derived from the features of the attachment device of the invention consists of it being possible, depending on the retaining means used on the attachment projections for holding the vanity mirror boxlike shell fixed in the corresponding cavity of the sunvisor one-piece casing, easily to remove the mirror boxlike shell from the cavity for maintenance and/or replacement operations of the mirror itself or of the devices it may contain such as, among others, the lighting devices for illuminating the immediate surroundings. All of this is generally hard to accomplish when the mirror boxlike shell is attached to the sunvisor one-piece casing by means of adhesive products.

BRIEF DESCRIPTION OF THE DRAWINGS

The preferred embodiments of the attachment device for sunvisor vanity mirrors of the invention are shown in the drawings accompanying the present specification. In the drawings.

DETAILED DESCRIPTION OF THE PREFERRED EMBODIMENTS

Figure 1:
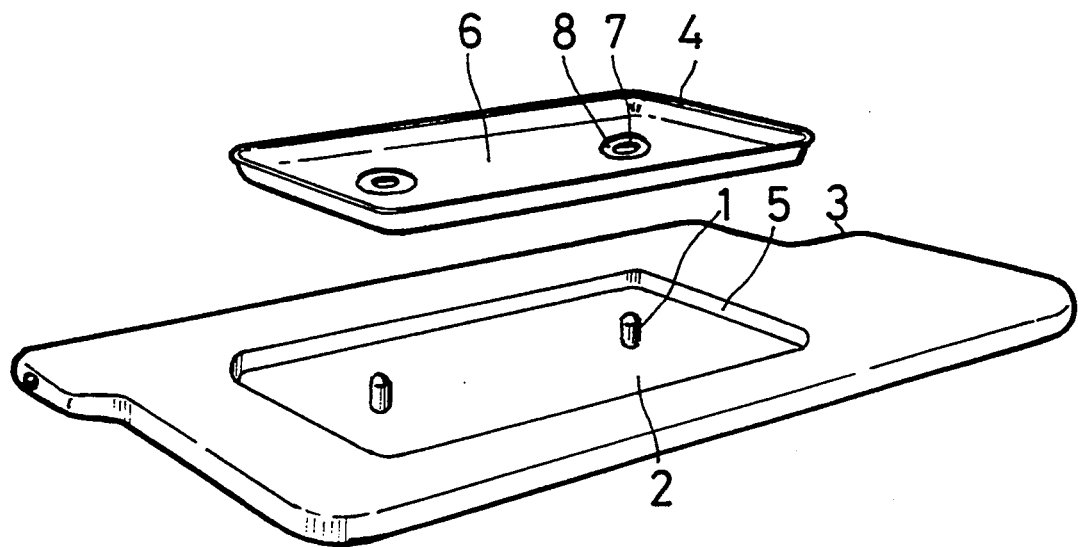
FIG. 1 is a perspective view showing one stage of the attachment of the vanity mirror boxlike shell to the sunvisor one-piece casing.
Figure 2:
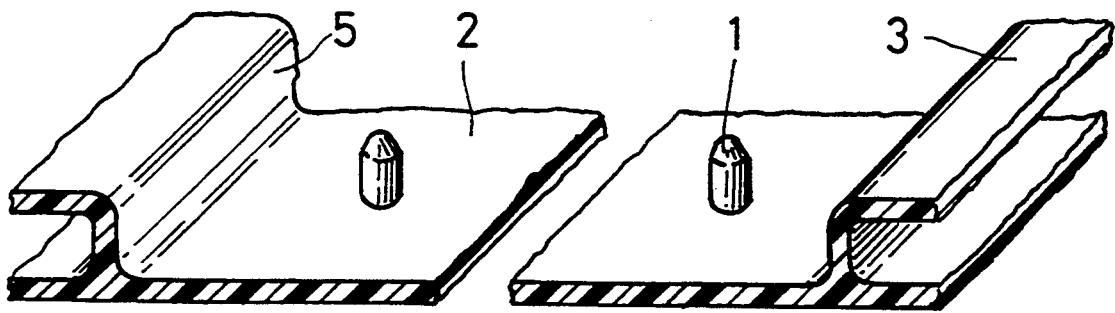
FIG. 2 is a perspective view of the attachment projections of the device of the invention.
Figure 3:
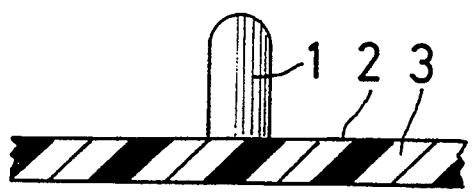
FIG. 3 is a cross-sectional view showing the attachment projections of the device of the invention.

The attachment device for sunvisor vanity mirrors of the invention described as an embodiment comprises, as shown in FIGS. 1 and 2 of the drawing sheets, the retaining projections 1 formed in the cavity 2 of the sunvisor casing 3 and any of the retaining means MR shown in FIGS. 5, 6, 7 and 9.

FIG. 1 shows that the sunvisor casing 3 is an essentially prismatic one-piece unit, the contour of which, given just as a guide, corresponds with the configuration of the automobile passenger compartment.

The casing 3 is made from plastics materials, such as polythene or polypropylene and is blow molded from these materials. The casing 3 is known to be provided, for the purpose of increasing the mechanical strength thereof, with a filling which may be formed by polythene, polypropylene or P.U.R. which, for the purposes of clarity of description, has not been shown in the Figures.

FIG. 1 shows that the casing 3 is formed, on one of the surfaces thereof, with the cavity 2 for snugly receiving the boxlike shell 4 of the vanity mirror, which, for the same reasons as given above, has not been fully shovel in the Figures.

In this embodiment, the vanity mirror boxlike shell 4 and the cavity 2 of the sunvisor casing 3, both shown in FIG. 1, are basically prismatic in shape and are mutually complementary for snug fitting together although, obviously, they may have any other configuration appropriate for each particular application, without affecting the functionality of the attachment device of the invention.

FIGS. 1 and 2 show that the cavity 2 of the casing 3 is provided with the attachment projections 1 which are essentially cylindrical and the free end thereof has a convex shape. In this embodiment of the attachment device of the invention, there are two attachment projections 1, located on the main longitudinal axis of the cavity 2 at a relatively short distance from the transverse walls 5. Obviously, the number and distribution of the attachment projections 1 depends on the needs and, in particular, on the size of the vanity mirror in each particular application. The location and number of the attachment projections 1 contemplated in this embodiment are given purely as an orientative example.

FIG. 1 shows that the surface 6, or bottom wall, of the vanity mirror boxlike shell 4 is provided with the through holes 7 which correspond functionally in number and position with the attachment projections 1 of the cavity 2 of the casing 3. In this embodiment, the through holes 7 are formed at the inner end thereof with respective mouths 8 consisting of an annular coaxial recess which merges into the through hole 7, defining an intermediate step.

Figure 5:
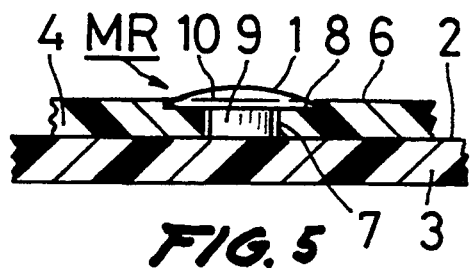
FIGS. 5, 6, 7 and 9 are cross-sectional views showing different embodiments of the retaining means of the device of the invention.

FIG. 5 shows an embodiment of the retaining means MR which is formed, preferably by ultrasonic techniques, on the attachment projection 1 so that it comprises the shank 9 and the seating head 10, the perimetral edge of which seats in the mouth 8 of the through hole 7 of the vanity mirror boxlike shell 4.

Figure 6:
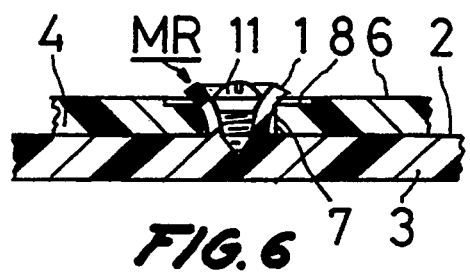

FIG. 6 shows another embodiment of the retaining means MR which is formed by the frustoconical self-tapping lock screw 11.

Figure 7:
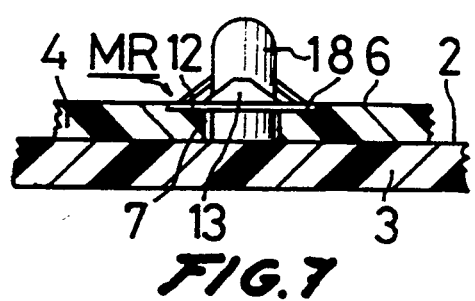
Figure 8:
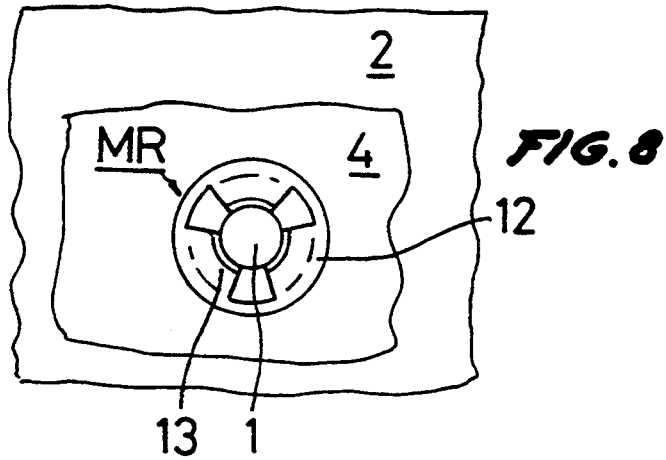
FIG. 8 is a top view of the retaining means shown in FIG. 7.

FIG. 7 shows another embodiment of the retaining means MR which is formed by the lock washer 12. FIGS. 7 and 8 show that the lock washer 12 is received in the mouth 8 of the through hole 7 of the boxlike shell 4 and is provided with three internal, equidistantly spaced apart, essentially trapezial locking projections 13, the smaller end of which forms the theoretical inside diameter of the lock washer 12. This theoretical inside diameter is relatively slightly smaller than the outside diameter of the attachment projection 1.

The number of locking projections 13 of the lock washer 12 in this embodiment of the retaining means MR is given only as a guide since it may vary depending on the needs of each particular application.

Figure 9:
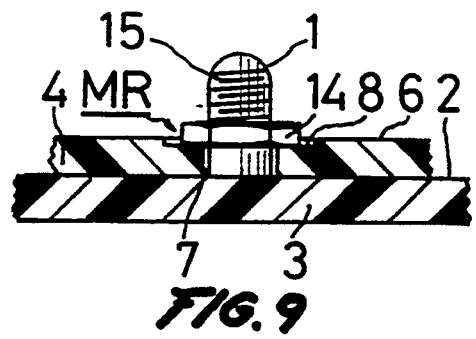

FIG. 9 shows another embodiment of the retaining means MR which is formed by the self-tapping lock nut 14 which is partially received in the mouth 8 of the through hole 7 of the boxlike shell 4.

The vanity mirror boxlike shell 4 is mounted to the sunvisor casing 3 by the sunvisor vanity mirror attachment device of the embodiments of FIGS. 5, 6, 7 and 9 as follows.

In the embodiment of FIG. 5 after the vanity mirror boxlike shell 4 has been attached to the cavity 2 in the sunvisor casing 3 with the through holes 7 and the attachment projections 1, using the retaining means MR shown in FIG. 5, the seating head 10 which, as said above is partially housed in the mouth 8 of the through hole 7, is shaped with ultrasonic techniques, by heat or by mechanical impact, so that it presses the boxlike shell 7 against the bottom wall of the cavity 2 of the casing 3.

Figure 4:
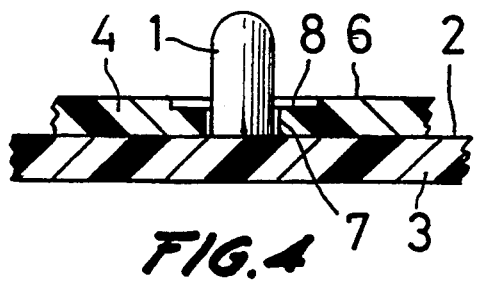
FIG. 4 is a cross-sectional view showing the vanity mirror boxlike shell and the sunvisor casing attached together.

In the embodiment of FIG. 6 once the boxlike shell 4 has been fitted in the cavity 2 as described above and as shown in FIG. 4 using the retaining means MR shown in FIG. 6, the self-tapping lock screw 11 is screwed into the attachment projection 1, with the insertion of the frustoconical shank of the self-tapping lock screw 11 determining the resilient deformation of the attachment projection 1 which also takes on an essentially frustoconical shape and, as shown in FIG. 6, the upper portion presses sideways and downwardly on the boxlike shell 4 which in turn presses against the bottom of the cavity 2 of the casing 3.

In the embodiment of FIG. 7 once the boxlike shell 4 has been fitted in the cavity 2 as described above and as shown in FIG. 4 using the retaining means MR shown in FIG. 7, the lock washer 12 is mounted with the locking projections 13 directed towards the free end of the attachment projection 1. The lock washer 12 is slid on the attachment projection 1 until it reaches the mouth 8 of the through hole 7 of the boxlike shell 4. In this position, the locking projections 13, which are resiliently deformed, wedge against the attachment projection 1 preventing reverse movement of the lock washer 12 in such a way that the boxlike shell 4 presses against the bottom of the cavity 2 of the casing 3.

In the embodiment of FIG. 9 once the boxlike shell 4 has been fitted in the cavity 2 as described above as shown in FIG. 4 using the retaining means MR shown in FIG. 9, the self-tapping lock nut 14 engages the attachment projection 1. By simple screwing it cuts the screw thread 15 on the attachment projection 1 until it reaches the position shown in FIG. 9 where it is partially housed in the mouth 8 of the through hole 7 of the boxlike shell 4, such that the boxlike shell 4 presses against the bottom wall of the cavity 2 of the casing 3.

In this way, the attachment device of the invention fixedly locks the position occupied by the vanity mirror boxlike shell 4 in the cavity 2 of the sunvisor casing 3, without having to have recourse to adhesive products, as happens with the known embodiments of fixing means for vanity mirrors in sunvisors, thereby avoiding the previously described problems derived from the use of such products.

Attachment of the vanity mirror boxlike shell 4 to the cavity 2 of the sunvisor casing 3 by any of the retaining means MR of the attachment device of the invention shown in FIGS. 6, 7, 8 and 9, allows the boxlike shell 4 to be removed from the cavity 2 for maintenance and/or replacement operations on the vanity mirror and the subsequent assembly of said boxlike shell 4 in the cavity 2 as described above for each of these embodiments of the retaining means MR.

While the invention has been illustrated and embodied in an attachment device for sunvisor vanity mirrors it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims.

We claim:

1. Attachment device for a sunvisor vanity mirror, said attachment device comprising:
   a plastic blow molded one-piece casing provided with a cavity having a rear surface and a plurality of essentially cylindrical attachment projections, each of said essentially cylindrical attachment projections extending perpendicularly from the rear surface of said cavity, each of said attachment projections having a free end;
   a vanity mirror box-like shell dimensioned to fit in said cavity, received in said cavity and provided with through holes positioned so that said attachment projections extend through said through holes; and
   retaining means secured on each of said attachment projections for fixing said box-like shell in said one-piece casing so as to hold said box-like shell in said cavity without adhesive means; and
   wherein said retaining means comprises a plastic deformed portion at the free end of the attachment projection having said retaining means, said deformed portion being made by one of ultrasonic methods, heating and mechanical impact, so that said boxlike shell is compressed between the deformed portion and the rear surface of the cavity in the one-piece casing.

2. Attachment device as defined in claim 1, wherein each of said through holes is coaxial with a recess provided in a bottom wall of said boxlike shell and said retaining means are at least partially received in said recesses.

3. Attachment device for a sunvisor vanity mirror, said attachment device comprising:
   a plastic blow molded one-piece casing provided with a cavity having a rear surface and a plurality of essentially cylindrical attachment projections, each of said essentially cylindrical attachment projections extending perpendicularly from the rear surface of said cavity, each of said attachment projections having a free end;
   a vanity mirror box-like shell dimensioned to fit in said cavity, received in said cavity and provided with through holes positioned so that said attachment projections extend through said through holes; and
   retaining means secured on each of said attachment projections for securing said box-like shell to said one-piece casing so as to hold said box-like shell in said cavity without adhesive means; and
   wherein said retaining means comprises a self-tapping lock screw having a frustoconical shank, said self-tapping lock screw being applied centrally to the free end of the attachment projections having the retaining means so as to resiliently deform said attachment portion so that the boxlike shell is compressed between an upper portion of the attachment projection and the rear surface of the cavity of the one-piece casing but said lock washer is removable so that said boxlike shell can be removed for maintenance and replacement operations.

4. Attachment device as defined in claim 3, wherein each of said through holes is coaxial with a recess provided in a bottom wall said boxlike shell and said retaining means are at least partially received in said recesses.

5. Attachment device for a sunvisor vanity mirror, said attachment device comprising:
   a plastic blow molded one-piece casing provided with a cavity having a rear surface and a plurality of essentially cylindrical attachment projections, each of said essentially cylindrical attachment projections extending perpendicularly from the rear surface of said cavity, each of said attachment projections having a free end;

a vanity mirror box-like shell dimensioned to fit in said cavity, received in said cavity and provided with through holes positioned so that said attachment projections extend through said through holes; and retaining means secured on each of said attachment projections for securing said box-like shell to said one-piece casing to hold said box-like shell in said cavity without adhesive means; and wherein said retaining means comprises an internally toothed lock washer engaged on the attachment projection having the retaining means so that the boxlike shell is compressed between the lock washer and the rear surface of the cavity of the one-piece casing but said lock washer is removable so that said boxlike shell can be removed for maintenance and replacement operations.

6. Attachment device as defined in claim 5, wherein each of said through holes is coaxial with a recess provided in a bottom wall of said boxlike shell and said retaining means are at least partially received in said recesses.

7. Attachment device for a sunvisor vanity mirror, said attachment device comprising:

a plastic blow molded one-piece casing provided with a cavity having a rear surface and a plurality of essentially cylindrical attachment projections, each of said essentially cylindrical attachment projections extending perpendicularly from the rear surface of said cavity, each of said attachment projections having a free end;

a vanity mirror box-like shell dimensioned to fit in said cavity, received in said cavity and provided with through holes positioned so that said attachment projections extend through said through holes; and retaining means secured on each of said attachment projections for securing said box-like shell in said casing to hold said box-like shell in said cavity without adhesive means; and wherein the retaining means comprises a self-tapping lock nut engaged on the attachment projection having the retaining means so that the boxlike shell is compressed between the lock nut and the rear surface of the one-piece casing but said lock nut is removable so that said boxlike shell can be removed for maintenance and replacement operations.

8. Attachment device as defined in claim 7, wherein each of said through holes is coaxial with a recess provided in a bottom wall of said boxlike shell and said retaining means are at least partially received in said recesses.

* * * * *